United States Patent [19]
Rigosi et al.

[11] Patent Number: 6,029,710
[45] Date of Patent: Feb. 29, 2000

[54] PROCESS FOR REPAIRING PLASTIC COATINGS OF METAL PIPES

[75] Inventors: Gian Luigi Rigosi; Roberto Marzola, both of Ferrara, Italy

[73] Assignee: Montell North America Inc., Wilmington, Del.

[21] Appl. No.: 09/117,606

[22] PCT Filed: Dec. 1, 1997

[86] PCT No.: PCT/EP97/06724

§ 371 Date: Feb. 4, 1999

§ 102(e) Date: Feb. 4, 1999

[87] PCT Pub. No.: WO98/24560

PCT Pub. Date: Jun. 11, 1998

[30] Foreign Application Priority Data

Dec. 2, 1996 [IT] Italy .................................. MI96A2519

[51] Int. Cl.$^7$ ....................................................... C10G 35/06
[52] U.S. Cl. ................................. 138/97; 138/99; 138/145
[58] Field of Search ................................ 138/99, 97, 145, 138/146; 427/407.1

[56] References Cited

U.S. PATENT DOCUMENTS

| | | | |
|---|---|---|---|
| 4,465,309 | 8/1984 | Nimke et al. | 138/99 X |
| 4,517,234 | 5/1985 | Fisher | 138/99 X |
| 4,533,419 | 8/1985 | Pieslak et al. | 138/99 X |
| 4,652,023 | 3/1987 | Timmons | 138/99 X |
| 4,656,070 | 4/1987 | Nyberg et al. | 138/99 X |
| 4,803,104 | 2/1989 | Peigneur et al. | 138/99 X |

*Primary Examiner*—Patrick Brinson

[57] ABSTRACT

Process for repairing plastic coatings of metal pipes that allows one to make the repair using only a flame as a source of heat, including the application of protective shields during specific operating phases of the process.

5 Claims, No Drawings

PROCESS FOR REPAIRING PLASTIC COATINGS OF METAL PIPES

BACKGROUND OF THE INVENTION

The present invention concerns a process for repairing plastic coating of metal pipes which allows one to obtain said repair using only a flame as the heat source for heating the area to be repaired.

Plastic coated metal pipes, usually made of steel, are widely employed for pipelines used for the transport, even at great distances, of fluid materials such as oil, natural gas, or water.

Said pipelines must be able to withstand the most varied environmental conditions, and, in certain cases, the high temperatures that are maintained, for example, in the proximity of pumping stations, or which may be typical of certain liquids extracted from the subsoil.

Therefore, so as not to create weak points along the pipeline, it is necessary that the damaged or removed parts of the plastic coating (for instance at the welding points of the pipes) be repaired in such a way as to obtain mechanical properties as homogeneous as possible with the original coating.

As an answer to such needs, materials and methodologies aimed at reaching said objective with satisfactory results are known in the art.

However, when the size of the damaged part is considerable (for example when the coating has been removed in order to weld the pipes), it is necessary to use complicated repairing techniques which require long periods of time and sophisticated and costly equipment, such as induction ovens. Italian patent application n. MI 96/A 001737 describes a repairing process particularly quick and effective, which limits the use of sophisticated and costly heating equipment, such as induction ovens, to the heating phase that precedes the application of the primer, and allows one to carry out the other heating phases with an inert gas shielded flame (where the gas is nitrogen for example), thus reducing or eliminating the contact between the air and the heated area.

BRIEF SUMMARY OF THE INVENTION

It has now been perfected a repairing process that allows the use of a flame alone as the heat source for the area being repaired. Moreover, according to the process of the present invention, the flame used can be an open flame, i.e., without any shielding aimed at reducing or eliminating the contact between the air and the heated area.

Therefore, the process of the present invention is considerably more simplified with respect to the processes previously used in the art, since it allows to eliminate the use of induction ovens and shielded flame, requiring only the use of open-flame equipment, such as a common gas torch.

Therefore, object of the present invention is a process for repairing plastic coatings of metal pipes (in particular polyolefin, preferably polypropylene and/or polyethylene coating) comprising the following operating phases:

1) applying of a protective shield on the coated pipe along the entire perimeter surrounding the exposed metal part to be coated, said shield comprising one or more components having two spacing elements that are protruding and opposite to each other and located on the periphery of the inside surface of the shield, where one of said elements is put in contact with the coating, and the other with the exposed metal part to be coated, leaving the edges of the coating on the inside of the space that is formed between the shield and the pipe;

2) optional application of an aqueous chromate solution on the exposed metal part previously heated with a flame;

3) heating the exposed metal part, with a flame, to a temperature ranging from 170° C. to 250° C., preferably from 190 to 230° C.;

4) optionally applying on the exposed metal part, an epoxy primer or a mixture of epoxy primer with an adhesive polyolefin material;

5) removing the protective shield;

6) applying on the exposed metal part, a layer of adhesive polyolefin material and a superimposed layer of a coating made of polyolefin material;

on condition that if a mixture of epoxy primer with a polyolefin adhesive material is applied during phase 4), the application of a layer of adhesive polyolefin material in phase 6) can be omitted.

Obviously, when the application of a layer of adhesive in phase 6) is omitted, the coating layer is directly applied on the mixture of epoxy primer and polyolefin adhesive material applied in phase 4).

DETAILED DESCRIPTION OF THE PREFERRED EMBODIMENTS

The term "exposed metal part" means that said metal part is not yet coated with a coating (as opposed to adhesive) layer of polyolefin material. Thanks to the application of the protective shield during phase 1), the exposed metal part can be heated to high temperatures without substantial degradation of the polymer material in the area bordering the existing coating.

Therefore, as previously stated, it is possible to use a flame, in particular an open flame, instead of an induction oven. Moreover, if the thickness of the metal constituting the pipe is adequately high (preferably greater than 8 mm) all the operating phases following phase 3) can be carried out without any further heating, taking advantage of the thermal capacity of the pipe and thanks to the high temperatures reached in phase 3), optionally providing an insulation for the surface just coated, i.e., after phase 6).

However, should one prefer to use additional heating phases, when finishing off the coating for example, it is possible to use for said purpose a shielded flame of the type described above, or use a shield of the type described for phase 1) between the open flame and the area to be heated.

The shield used in phase 1) is preferably made of a thermo-insulating material, such as glass wool for example, covered with a metallic foil, made of steel for example. Said shield can be made up of a single component shaped in such a way that it covers the entire perimeter of the area to be coated, i.e., having a shape basically identical to the contours of the area to be coated.

As an alternative the shield can comprise two or more components. For example one can use two ring-shaped components to be superimposed separately on the two edges of the existing coating when said coating has been previously removed along a strip corresponding to a welded joint. It is also possible to use components with dissimilar shapes which optionally can be fitted together to form complex structures.

The two protruding-spacing elements that cause the contact of the shield and pipe along the edge of the area to be coated, are preferably two walls perpendicular to the inside surface of the shield. Thus, when the shield and pipe are put in contact with each other, a space is formed that contains the edge of the existing coating that needs to be repaired.

Therefore, it is evident that the shield has the double function of isolating the edge of the existing coating to be repaired from both the direct flame and the high temperatures. The shield can be firmly fixed to the pipe using, for example, mechanical mounting tools, particularly clasps, capable of securing the shield against the pipe.

It is also possible to apply on the pipe, prior to phase 1), one or more protective shells in direct contact with the existing coating at the edge of the area to be coated, in order to avoid the detachment of said existing coating from the pipe during the heating process.

Therefore, said protective shells will be contained within the space obtained during phase 1) when the protective shield is applied.

As previously stated, the flame used in the process of the present invention can be either shielded or open.

A shielded flame can be obtained, for example, using guns or sprayers having a central nozzle for optionally spraying powders, and concentric circles of nozzles.

The combustible gas (such as methane, propane, or butane for example) is fed through one or more circles of nozzles, while the inert shielding gas is fed through one or more concentric circles of nozzles. Thus when the combustible gas is lit the shielded flame, (i.e., capable of avoiding the degradation of the polymer with which it comes in contact) is obtained.

The open flame can be obtained with common gas torches (using methane, propane, or butane for example).

The aqueous chromate solution that is optionally applied on the exposed metal part (phase 2)), is selected from the types commonly used in the art. For example, one can use chromate solutions at 10% by weight.

The above mentioned solution can be applied by spraying for example.

Before applying the solution, the exposed metal part is preheated at a temperature preferably ranging from 50 to 80° C. The epoxy primer that is optionally applied to the exposed metal part (phase 4)) is also selected among the types commonly used in the art.

In particular one can use bicomponent epoxy resins, liquid or solid, comprising an epoxy base and a cross-linking agent, such as polyamine for example.

The epoxy primer or the mixture of epoxy primer and an adhesive polyolefin material can be applied, for example, by using sprayers designed for liquids or powders. The polyolefin adhesive applied during phase 6) is preferably in the form of a powder, which can be applied using powder sprayers, for example, or shielded flame guns of the type described above. Preferably, the powder polyolefin adhesive is made of a polyolefin composition comprising in weight percentage:

A) from 30% to 94%, preferably from 50% to 85%, of polypropylene or polyethylene (HDPE, LDPE, or LLDPE), or of a propylene/ethylene or propylene/ethylene/$C_4$–$C_{10}$ α-olefin crystalline random copolymer;

B) from 0% to 70%, preferably from 5% to 40%, of an ethylene/propylene or ethylene/1-butene elastomeric polymer preferably containing from 30 to 70% of ethylene;

C) from 0.5% to 10%, preferably from 2% to 4%, of polypropylene or polyethylene (HDPE, LDPE, or LLDPE) modified with polar groups (in particular by way of partial or total grafting of maleic anhydride or isophorone bismaleamic acid) in quantities ranging from 0.5 to 10%;

D) from 0% to 0.5%, preferably from 0.1 to 0.5%, of a nucleating agent, such as dibenzylidene sorbitol or talc for example;

E) from 0% to 10%, preferably from 6% to 10%, of titanium dioxide;

said composition having a melt index L (ASTM D 1238 L) from 3 to 150, preferably from 5 to 90 g/10 minutes, when the composition has a predominantly polypropylene base, or a melt index E (ASTM D 1238 E) from 0.1 to 20, preferably from 0.5 to 15 g/10 minutes, when the composition has a predominantly polyethylene base, and being in powder form with a particle diameter that does not exceed 600 micrometers.

When the above mentioned composition is in powder form, preferably said powder has the following particle size distribution (weight percentage):

not more than 25%, preferably not more than 4%, of powder having a particle diameter ranging from 300 to 450 micrometers;

not more than 10%, preferably not more than 0.6%, of powder having a particle diameter greater than 450 micrometers.

Preferably, by "predominantly polypropylene base" composition it is meant a composition where component (A) consists of polypropylene, or of a propylene/ethylene or propylene/ethylene/$C_4$–$C_{10}$ α-olefin crystalline random copolymer or mixtures thereof, while by "predominantly polyethylene base" composition it is meant a composition whose component (A) consists of polyethylene.

Examples of $C_4$–$C_{10}$ α-olefins that may be present in component (A) are: 1-butene; 1-hexene; 1-octene; 4-methyl-1-pentene. When present, the quantity of $C_4$-$C_{10}$ α-olefins ranges from 2% to 10% by weight.

The content of ethylene in component (A) preferably ranges from 0.1 to 8% by weight.

Examples of the above mentioned polyolefin composition are described in published European patent application n. 603 906. Preferably, the adhesive layer applied during phase 6) has a thickness of 500–600 μm.

The mixture of epoxy primer and an adhesive polyolefin material that is optionally applied during phase 4), is prepared by mixing the two components in various ways. In particular said mixture can be:

1. a physical mixture of the powders of the two components, or 2. a mixture of the two components in the molten state, which mixture is subsequently milled.

The two components, i.e., the epoxy primer and the adhesive polyolefin material, are preferably of the types described above.

However, the particle size distribution of the adhesive polyolefin material is not critical.

The concentration of the adhesive polyolefin material in mixture 1 can vary from 20% to 80% by weight, preferably from 40% to 60% by weight.

In mixture 2 the concentration of the adhesive polyolefin material can vary from 5% to 30% by weight.

Mixture 2 is preferably prepared using a mixer or extruder of a known type, and operating in such a way that the adhesive polyolefin material, already melted, is mixed with the melted epoxy primer, which is maintained at a temperature generally lower that the melt temperature of the adhesive polyolefin material, preferably around 80° C. After a quick mixing process the total mass is cooled in order to avoid cross-linking, and is subsequently milled.

An advantage of using mixtures of epoxy primer and adhesive polyolefin material is that the two components can react chemically because they are in intimate contact in the molten state, independently from the application times required by the specific application technology.

Moreover, it is known that at the present time the spraying phase of the epoxy primer in the pure state is very critical, since said primer must be kept in contact only with the exposed metal, while any trace of primer that comes in contact with the existing layer of polyolefin coating applied at the plant prevents the adhesion of said coating, for example, with the coextruded strap described below.

As previously stated, a layer of polyolefin coating is applied during phase 6). Said coating is preferably applied in the form of a tape or a strap.

Generally speaking, the layer of coating can substantially consist of a propylene or ethylene homopolymer, or of a copolymer of propylene with ethylene and/or higher α-olefins (in particular $C_4$–$C_8$), or of a copolymer of ethylene with the above mentioned higher α-olefins, or of mixtures of the above mentioned (co)polymers.

Examples of $C_4$–$C_8$ α-olefins are those given above for the powder polyolefin adhesive.

Other components commonly used in the art, such as fillers or pigments for example, can be present in the composition of the coating layer.

In particular, the coating layer can be in the form of a tape or strap consisting of a polyolefin composition comprising:

a) 10–60, preferably 20–50 parts by weight of polypropylene homopolymer with an isotactic index greater than 90, particularly ranging from 95 to 98, or of a crystalline copolymer of propylene with ethylene and/or with a $CH_2$=CHR α-olefin, where R is an alkyl radical with 2–6 carbon atoms, containing over 85% by weight of propylene, and having an isotactic index greater than 85%;

b) 10–40 parts by weight of a polymer fraction containing ethylene, insoluble in xylene at ambient temperature (about 25° C.);

c) 30–60, preferably 30–50 parts by weight of an amorphous ethylene/propylene copolymer fraction optionally containing minor portions of a diene, soluble in xylene at ambient temperature and containing 40–70% by weight of ethylene, said polyolefin composition being cross-linked by way of grafting an alkenyl derivative of alkoxysilane and reaction with water, until obtaining hot set values, according to CEI 20–31, lower than 175%, preferably lower than 120%, at 200° C., and lower than 15%, preferably lower than 10%, at 23° C.

Polymer compositions comprising (a)+(b)+(c) are described in published european patent application n. 400333.

Generally speaking the total content of polymerized ethylene in the above compositions ranges from 20 to 60% by weight. In fraction (a) the $CH_2$=CHR α-olefin, where R is an alkyl radical with 2–6 carbon atoms, is preferably selected from 1-butene, 1-pentene, 4-methyl-1-pentene.

The diene in fraction (c) is preferably selected from butadiene, 1,4-hexadiene, 1,5-hexadiene, ethylidine-1-norbornene.

The molecular weight of the various fractions (determined by measuring the intrinsic viscosity in tetrahydronaphthalene at 135° C.) varies in function of the nature of the components and the total melt index of the composition.

Preferably it is comprised between the following limits:
0.5–3 dl/g for fraction (a);
2–8 dl/g for fraction (b)+(c).

The electronic microscope analysis of the compositions indicates that the dispersed phase consists of the amorphous ethylene-propylene copolymer and the average particle size is less than 2 microns.

Examples of preferred alkenyl derivatives of alkoxysilanes used to obtain the cross-linking of the above mentioned compositions are vinyltriethoxysilane, allyltriethoxysilane, and divinyldimethoxysilane.

Generally the alkenyl derivatives of alkoxylanes are grafted to the polyolefin composition by way of extrusion in the presence of peroxides.

Examples of the above mentioned polyolefin composition are described in published European patent application n. 619 343. As an alternative to the above mentioned cross-linked polyolefin composition one can use, for the polyolefin tape or strap, polyethylene (HDPE, LDPE, or LLDPE) that is adequately cross-linked using the above mentioned technique, for example, of grafting an alkenyl derivative of alkoxysilane and reaction with water.

According to a preferred variation, the coating layer, in particular the polyolefin tape or strap, comprise a layer that essentially consists of the polyolefin materials mentioned above, and an additional layer, coextruded for example, of an adhesive polyolefin material (in particular of the above mentioned type).

Of course, the layer of polyolefin adhesive is placed on the surface to be coated during the application of the tape or strap.

Preferred examples of the composition of polyolefin adhesives that can be used for the above mentioned additional layer of polyolefin film are those described above for the powder polyolefin adhesive.

As a way of example, the repair of the coating of a welded joint of two steel pipes having a 30 cm diameter, from which the preexisting polypropylene coating has been removed in order to obtain an exposed area of 30 cm between the two edges of the preexisting coating, can be carried out as follows.

The exposed area to be coated is sanded.

Two 10 cm wide ring-shaped steel shells are applied making sure that they come in direct contact with the edges of the existing coating, and then they are fastened with belts.

Phase 1)

On the pipe prepared in this manner is applied a protective shield comprising two ring-shaped components 30 cm wide having two ring-shaped walls on the edges, perpendicular to the inside surface of said components and being 5–10 mm longer than the thickness of the coating. Said walls constitute the protruding-spacing elements.

By applying the above mentioned components, one on each edge of the existing coating, one creates two spaces containing the two edges of said coating which are covered with the steel shells referred to above.

The protective shield consists of glass wool covered with steel foil. The shield is fixed by securing the two components on the pipe with clasps.

Phase 2

A 10% by weight aqueous chromate solution is sprayed on the exposed metal part that has been preheated to 70° C. with a gas torch.

Phase 3

The exposed metal part that has been treated with the aqueous chromate solution is heated with a gas torch until it reaches a temperature of about 230° C.

Phase 5 (phase 4) is not carried out)

The protective shield applied in phase 1) is removed by releasing the clasps.

Phase 6)

On the exposed metal surface one applies a layer of about 500–600 micrometers of a powder polyolefin adhesive obtained by mixing the following components in the molten state (weight percentage):

A) 52.5% of a propylene/ethylene crystalline random copolymer containing 4% of ethylene;
B) 40% of a concentrate consisting of a heterophasic copolymer comprising 70% of a crystalline propylene random copolymer containing 2.5% of ethylene, and 30% of an ethylene/propylene elastomer containing 60% of ethylene;
C) 3.5% of a propylene homopolymer modified with 2% maleic anhydride;
E) 4% $TiO_2$.

The resulting composition has a melt index L of 80 g/10 minutes (obtained by way of visbreaking), and is milled, thus producing a powder with a particle diameter not exceeding ca. 350 micrometers and the following particle size distribution (weight percentage):

not more than 5% of the powder has a particle diameter ranging from 250 to 300 micrometers, not more than 1% of the powder has a particle diameter greater than 300 micrometers.

The adhesive is applied using a powder sprayer.

The area to be coated is then wrapped with a 5 cm wide, coextruded tape having a 200 micrometer thick layer of the same composition as the above mentioned powder polyolefin adhesive, and a 500 micrometer thick layer of a cross-linked polyolefin composition.

Said composition is prepared starting with a non-cross-linked heterophasic composition consisting of (weight percentage):
A) 40% of polypropylene homopolymer with an isotactic index of 97.5%;
B) 15% of a polymer fraction containing ethylene, insoluble in xylene at ambient temperature;
C) 45% of an amorphous ethylene/propylene copolymer fraction containing 50% of ethylene, and soluble in xylene at ambient temperature.

The above mentioned heterophasic composition is extruded at 190° C. with 2 parts by weight of vinyltriethoxysilane, and 0.1 parts by weight of dicumylperoxide, per 100 parts by weight of heterophasic composition. The polymer thus obtained is subjected to additional mixing using the same extrusion method, with 0.2 parts by weight of tin dibutyllaurate per 100 parts by weight of polymer, and the entire resulting product is coextruded, thus obtaining the tape mentioned above by using a flat extrusion die. The tape is then maintained in a moist air atmosphere in order to obtain cross-linking.

The extruded tape is wrapped around the area to be coated with an edge overlap of about 2.5 cm.

As an alternative, one can use a tape as long as the circumference of the pipe, and as large as the width of the exposed metal surface to be coated, placing said tape lengthwise on the area to be coated and pressing it against the surface of the pipe in order to cover the latter entirely.

In either case the sections of coating that are not well sealed at the edges of the preexisting coating are removed, and the adjoining parts of both coatings are welded together with an extruded strand of melted polymer.

The coating of the repaired area has the following properties:

| Properties | Method | Value |
| --- | --- | --- |
| Peeling at 90° C. | NFA 49711 | 4–8 kg/cm |
| Cathodic disbonding at 23° C. (average radius of advancement) | NFA 49711 | 6–12 cm |

We claim:

1. Process for repairing plastic coatings of metal pipes comprising the following operating phases:

1) applying a protective shield on the coated pipe along an entire perimeter surrounding an exposed metal part to be coated, said shield comprising one or more components having two spacing elements that are protruding and opposite to each other and located on the periphery of the inside surface of the shield, where one of said elements is put in contact with the coating, and the other with the exposed metal part to be coated, leaving the edge of the coating on the inside of the space that is formed between the shield and the pipe;

2) optionally applying an aqueous chromate solution on the exposed metal part;

3) heating the exposed metal part, with a flame, to a temperature ranging from 170° C. to 250° C.;

4) optionally applying, on the exposed metal part, an epoxy primer or a mixture of epoxy primer with an adhesive polyolefin material;

5) removing the protective shield;

6) applying, on the exposed metal part, a layer of adhesive polyolefin material and a superimposed layer of a coating made of polyolefin material;

on condition that if a mixture of epoxy primer with a polyolefin adhesive material is applied during phase 4), the application of a layer of adhesive polyolefin material in phase 6) can be omitted.

2. The process of claim 1, where the adhesive polyolefin material applied during phase 6) consists of a polyolefin composition comprising by weight:

A) from 30% to 94% of polypropylene or polyethylene (HDPE, LDPE, or LLDPE), or of a propylene/ethylene or propylene/ethylene/$C_4$–$C_{10}$ α-olefin crystalline random copolymer;
B) from 0% to 70% of an elastomeric ethylene/propylene or ethylene/1-butene polymer;
C) from 0.5% to 10% of polypropylene or polyethylene (HDPE, LDPE, or LLDPE) modified with polar groups in quantities ranging from 0.5 to 10%;
D) from 0% to 0.5% of a nucleating agent;
E) from 0% to 10% of titanium dioxide; said composition having a melt index L (ASTM D 1238 L) from 3 to 150 g/10 minutes when the composition has a predominantly polypropylene base, or a melt index E (ASTM D 1238 E) from 0.1 to 20 g/10 minutes when the composition has a predominantly polyethylene base, and being in powder form with a particle diameter that does not exceed 600 micrometers, with the following particle size distribution (weight percentage):

not more than 25% of powder having a particle diameter ranging from 300 to 450 micrometers;

not more than 10% of powder having a particle diameter greater than 450 micrometers.

3. The process of claim 1, where the adhesive polyolefin material present in the mixture applied in phase 4) consists of a composition comprising by weight:

A) from 30% to 94% of polypropylene or polyethylene (HDPE, LDPE, or LLDPE), or of a propylene/ethylene or propylene/ethylene/$C_4$–$C_{10}$ α-olefin crystalline random copolymer;

B) from 0% to 70% of an elastomeric ethylene/propylene or ethylene/1-butene polymer;

C) from 0.5% to 10% of polypropylene or polyethylene (HDPE, LDPE, or LLDPE) modified with polar groups in quantities ranging from 0.5 to 10%;

D) from 0% to 0.5% of a nucleating agent;

E) from 0% to 10% of titanium dioxide;

said composition having a melt index L (ASTM D 1238 L) from 3 to 150 g/10 minutes when the composition has a predominantly polypropylene base, or a melt index E (ASTM D 1238 E) from 0.1 to 20 g/10 minutes when the composition has a predominantly polyethylene base.

4. The process of claim 1, where the layer of polyolefin coating applied in phase 6) consists essentially of a propylene or ethylene homopolymer, or of a copolymer of propylene with ethylene and/or higher α-olefins, or of a copolymer of ethylene with the above mentioned higher α-olefins, or mixtures of the above mentioned (co)polymers.

5. The process of claim 1, where the layer of polyolefin material applied in phase 6) comprises a layer consists essentially of a propylene or ethylene homopolymer, or of a copolymer of propylene with ethylene and/or higher α-olefins, or of a copolymer of ethylene with the above mentioned higher α-olefins, or mixtures of the above mentioned (co)polymers, and an additional layer of adhesive polyolefin material.

* * * * *

UNITED STATES PATENT AND TRADEMARK OFFICE
CERTIFICATE OF CORRECTION

PATENT NO. : 6,029,710
DATED : February 29, 2000
INVENTOR(S) : Gian Luigi Rigosi et al.

Page 1 of 1

It is certified that error appears in the above-identified patent and that said Letters Patent is hereby corrected as shown below:

<u>Column 1,</u>
Line 58, delete -- of -- after "applying"

<u>Column 2,</u>
Line 1, change "optional application of" to -- optionally applying --

Signed and Sealed this

Fifth Day of February, 2002

Attest:

JAMES E. ROGAN
Attesting Officer       Director of the United States Patent and Trademark Office